(12) United States Patent
Klein et al.

(10) Patent No.: US 10,007,721 B1
(45) Date of Patent: Jun. 26, 2018

(54) COMPUTER SYSTEMS, METHODS, AND COMPONENTS FOR OVERCOMING HUMAN BIASES IN SUBDIVIDING LARGE SOCIAL GROUPS INTO COLLABORATIVE TEAMS

(71) Applicant: Collaboration. AI, LLC, Minneapolis, MN (US)

(72) Inventors: Peter Linus Klein, Minneapolis, MN (US); Mohammed Jamal, Sharjah (AE)

(73) Assignee: Collaboration. AI, LLC, Minneapolis, MN (US)

( * ) Notice: Subject to any disclaimer, the term of this patent is extended or adjusted under 35 U.S.C. 154(b) by 0 days. days.

(21) Appl. No.: 15/438,066

(22) Filed: Feb. 21, 2017

Related U.S. Application Data

(63) Continuation-in-part of application No. 15/201,071, filed on Jul. 1, 2016, now abandoned.

(60) Provisional application No. 62/385,996, filed on Sep. 10, 2016, provisional application No. 62/187,945, filed on Jul. 2, 2015, provisional application No. 62/327,567, filed on Apr. 26, 2016.

(51) Int. Cl.
*G06F 17/30* (2006.01)
*G06Q 50/00* (2012.01)
*G06F 3/0484* (2013.01)

(52) U.S. Cl.
CPC .. *G06F 17/30713* (2013.01); *G06F 17/30675* (2013.01); *G06Q 50/01* (2013.01); *G06F 3/04847* (2013.01)

(58) Field of Classification Search
CPC ......... G06F 17/30713; G06F 17/30675; G06F 3/04847; G06Q 50/01
See application file for complete search history.

(56) References Cited

U.S. PATENT DOCUMENTS

| | | | |
|---|---|---|---|
| 8,005,767 B1 * | 8/2011 | Cassella ............... | G06K 9/6262 706/12 |
| 8,027,944 B1 * | 9/2011 | Heidenreich ............ | G06N 5/02 706/46 |
| 8,032,470 B1 * | 10/2011 | Heidenreich ............ | G06N 5/04 706/45 |
| 8,676,735 B1 * | 3/2014 | Heidenreich ............ | G06N 5/02 706/45 |

(Continued)

*Primary Examiner* — James Trujillo
*Assistant Examiner* — Hubert Cheung
(74) *Attorney, Agent, or Firm* — Stoel Rives LLC

(57) ABSTRACT

Humans have collaborated in both small and large groups for thousands of years, sometimes achieving great feats for the good of all mankind. However, most groups have failed to achieve greatness, often because of poor group "chemistry" and/or because of missing skills or insights. These problems typically arise because group organizers build groups using human mental processes that suffer from social, racial, gender, ethnic, or other unconscious biases. To reduce impact of these biases and help organizers form more effective groups or teams, the present inventors have devised, among other things, an exemplary system that subdivides a group of user data structures into subgroups, based on similarities between electronic surveys and/or other data types, such as social media and network analysis data types. The system further includes user interfaces for creating surveys, implementing user preferences regarding subgroup membership and sizes, controlling the subdivision process, and displaying the subgroups.

21 Claims, 7 Drawing Sheets

(56) References Cited

U.S. PATENT DOCUMENTS

| | | | | |
|---|---|---|---|---|
| 2004/0043420 | A1* | 3/2004 | Fowlkes | G01N 33/566 |
| | | | | 435/7.1 |
| 2007/0288498 | A1* | 12/2007 | Dietz | G06F 17/30864 |
| 2008/0228857 | A1* | 9/2008 | Ostertag | G06Q 10/06311 |
| | | | | 709/201 |
| 2009/0043621 | A1* | 2/2009 | Kershaw | G06Q 10/06 |
| | | | | 705/7.16 |
| 2009/0216626 | A1* | 8/2009 | Lund | G06Q 30/02 |
| | | | | 705/7.31 |
| 2010/0088148 | A1* | 4/2010 | Presswala | G06Q 30/02 |
| | | | | 705/7.29 |
| 2011/0106807 | A1* | 5/2011 | Srihari | G06F 17/30604 |
| | | | | 707/739 |
| 2011/0131120 | A1* | 6/2011 | Sciuk | G06Q 10/06311 |
| | | | | 705/34 |
| 2012/0271827 | A1* | 10/2012 | Merz | G06F 17/30985 |
| | | | | 707/737 |
| 2013/0006685 | A1* | 1/2013 | Kelkar | G06Q 10/00 |
| | | | | 705/7.11 |
| 2013/0024447 | A1* | 1/2013 | Leng | G06Q 30/0282 |
| | | | | 707/724 |
| 2014/0201126 | A1* | 7/2014 | Zadeh | G06K 9/627 |
| | | | | 706/52 |
| 2015/0112743 | A1* | 4/2015 | Witmer | G06Q 10/063112 |
| | | | | 705/7.14 |
| 2015/0286696 | A1* | 10/2015 | Wang | G06F 17/30345 |
| | | | | 707/611 |
| 2016/0171514 | A1* | 6/2016 | Frank | G06F 17/30867 |
| | | | | 705/7.29 |
| 2016/0203433 | A1* | 7/2016 | Chen | G06Q 10/063112 |
| | | | | 705/7.14 |
| 2016/0350416 | A1* | 12/2016 | Ishii | G06F 17/30247 |

* cited by examiner

Fig. 3

COMPUTER SYSTEMS, METHODS, AND COMPONENTS FOR OVERCOMING HUMAN BIASES IN SUBDIVIDING LARGE SOCIAL GROUPS INTO COLLABORATIVE TEAMS

RELATED APPLICATIONS

The present application claims priority to U.S. Provisional Patent Application 62/385,996 filed Sep. 10, 2016 and to U.S. Non-Provisional patent application Ser. No. 15/201,071 filed Jul. 1, 2016. The Non-Provisional claims priority to U.S. Provisional Patent Applications 62/327,567 filed Apr. 26, 2016 and 62/069,350 filed Jul. 2, 2015. These four applications are incorporated herein by reference in their entirety.

COPYRIGHT NOTICE AND PERMISSION

A portion of this patent document contains material subject to copyright protection. The copyright owner has no objection to the facsimile reproduction by anyone of the patent document or the patent disclosure, as it appears in the patent and trademark office patent files or records, but otherwise reserves all copyrights whatsoever. The following notice applies to this document: Copyright © 2015-2016 Peter Linus Klein.

TECHNICAL FIELD

Various embodiments of the present invention concern organizational science and human resource management, particularly computerized systems and methods for organizing groups of people into smaller groupings or teams.

BACKGROUND

We humans are social creatures, and have socialized, worked, and otherwise collaborated in both small and large groups for thousands of years. Many of these groups or teams have collaborated to achieve great feats for the good of all mankind, feats including building the great pyramids, circumnavigating the globe, establishing new nations, building the world's first flying machine, winning world wars, producing new medical treatments, sending a man to the moon, to name a few. Pick any great achievement and the odds are that there is a great team behind it. All this suggests that the future of the world depends on the work of great teams.

The present inventors have recognized that there are at least three problems that are inhibiting formation of more great teams.

The first problem is that many teams fail or underperform because of poor interactions between group members and/or because one or more group members lacked essential attributes needed for the group to succeed at whatever mission it takes on. The problem is rampant and generally stems from the fact that teams are built largely using human mental processes. Which are heavily influenced or completely dictated by traditional organizational or social hierarchies; inherent or implicit social, racial, gender, ethnic, or other conscious and unconscious biases within team organizers; and an inability of team organizers to objectively process real data. Wherever these failures occur they are not only costly in terms of lost time and money of businesses and other organizations relying on team performance, but also costly in terms of the wasted effort and emotional stress on team members who joined the teams to achieve something bigger than they could do alone.

The second team formation problem recognized by the present inventors is in the context of education, for example within universities, colleges, high schools, and so forth. In this context, many teams are formed for group projects and study groups, etc. The groups are typically small in number and formed during class in rapid ad hoc ways with consideration of only a few of the many relevant variables. For example, teams for group projects are often based largely on seating proximity or alphabetical order, resulting in widely variant team efficacy. Moreover, students enrolled in any given class also constitute a team. These classroom teams are typically self-organized by students or school administrators based on teacher or scheduling preferences, ignoring numerous individual student traits that affect the entire group learning experience within every class.

The third problem recognized by the present inventors is related to formation of teams or groups in the context of temporary events, such as conferences and conventions, where hundreds or thousands of people may come together to learn or confer around a particular topic, such as education, healthcare, or technology. Many of the participants come not only to learn from speakers at these events, but also to meet new people and form new relationships that can lead to professional and personal collaborations. In most of these conferences and conventions, the peer-to-peer interactions are largely serendipitous, that is, uncoordinated in any systematic or intelligent way around particular user interests or desires, leaving participants to rely on ad hoc introductions and happenstance or to generally fend for themselves in coordinating advantageous meetings. As a result, many of the participants miss out on opportunities to further leverage their investment in money, time, and energy to attend conferences and conventions.

Beyond these problems in organizational, educational, and event team or group formation contexts, the present inventors also recognize that, in broader terms, how well we get along as humans at every level—within friendships, partnerships, and local, national, and international communities—depends on our collective capacity to collaborate and work effectively. While the internet has powered unprecedented interconnectivity, global communications, and informational sharing, it has also exponentially amplified our capacity to behave according to implicit and explicit human biases at every level of interaction, giving rise to insular social, economic, and political echo chambers that regard each other as enemies to oppose rather than friends to commune with. This insularity breeds increasing rigidity in thought and behavior that threaten our capacities not only to understand each other and live peacefully together, but also to collaborate with sufficient diversity to address our grand global challenges.

Accordingly, the present inventors have recognized a need for better ways of bringing people together into small groups or teams to achieve desired objectives.

SUMMARY

To address one or more of problems, the present inventors devised, among other things, one or more exemplary computerized systems, methods, devices, components, software, and graphical user interfaces for facilitating introductions, connections, interactions, networking, and team formation among groups of people based on associated profiles or data sets.

One embodiment takes the form of a software as a service (SaaS) cloud based system that leverages artificial intelligence, for example clustering algorithms, to organize groups of 4 or more people into multiple teams based on one or more team-defining attributes or rules and data associated with each person. Data related to background, knowledge, interests, and relationships, for example, are considered in relation to team objectives or goals. In some embodiments, the data sets include affective, cognitive, and/or conative profile data as well as internet and social media data for each of the individuals, ultimately expanding the capability of team and group organizers around the world to readily organize groups of employees, conference attendees, students, athletes, and so forth into more effective teams with unprecedented ease, flexibility, and consistency.

More specifically, the exemplary embodiment receives information in the form of database outputs, completed surveys, personal cognitive, affective, and conative assessments, performance metrics, email communications, social media activity, relationships, network analysis results, and other structured and un-structured textual data directly or via one or more application program interfaces (APIs) for the members of a group to be subdivided into smaller subgroups or teams. The system then determines mathematical distances between every possible pair of members in the group based on the received data, which in turn are used within one or more clustering algorithms, such as hierarchical clustering, to form optimal groups. The optimal groups are then refined or rebalanced to meet desired team-size constraints and other business rules, before being presented via various graphical user interfaces to team organizers and/or participants.

Some embodiments of the system receive user ratings and/or other data on team performance, feeding this information back into the clustering and/or refinement algorithms so that the system learns over time what types of member pairings, groupings, or business rules yield optimal or suboptimal performing teams. Some embodiments also automatically tag portions of raw user data with meta- or categorical tags, and then use these tags as additional inputs into the team formation process. For example, some embodiments may tag users identifying interests in hiking, sailing, or rock climbing with the tag "active outdoor sports" which might then encourage grouping of these individuals together or separating them from individuals with interest in cigar smoking, wine tasting, or crocheting. Additionally, some embodiments further include graphical user interfaces which allow properly permissioned users to not only rapidly generate fully or semi-customized surveys or questionnaires that can be used in the formation of the teams, but also to select and adjust the weight or significance of various questions and/or other data within the team formation process.

BRIEF DESCRIPTION OF DRAWINGS

Various embodiments are described herein with reference to the following attached figures (Figs). These figures are annotated with reference numbers for various features and components, and these numbers are used in the following description as a teaching aid, with like numbers referring to the same or similar features and components.

FIGS. 3-6 are facsimiles of portions of a graphical user interface corresponding to one or more embodiments of the present invention.

DESCRIPTION OF EXEMPLARY EMBODIMENTS

This document, which incorporates drawings and claims, describes one or more specific embodiments of one or more inventions. These embodiments, offered not to limit but only to exemplify and teach the invention, are shown and described in sufficient detail to enable those skilled in the art to implement or practice the invention(s). Thus, where appropriate to avoid obscuring the invention(s), the description may omit certain information known to those of skill in the art.

Exemplary Systems

Figure 1:
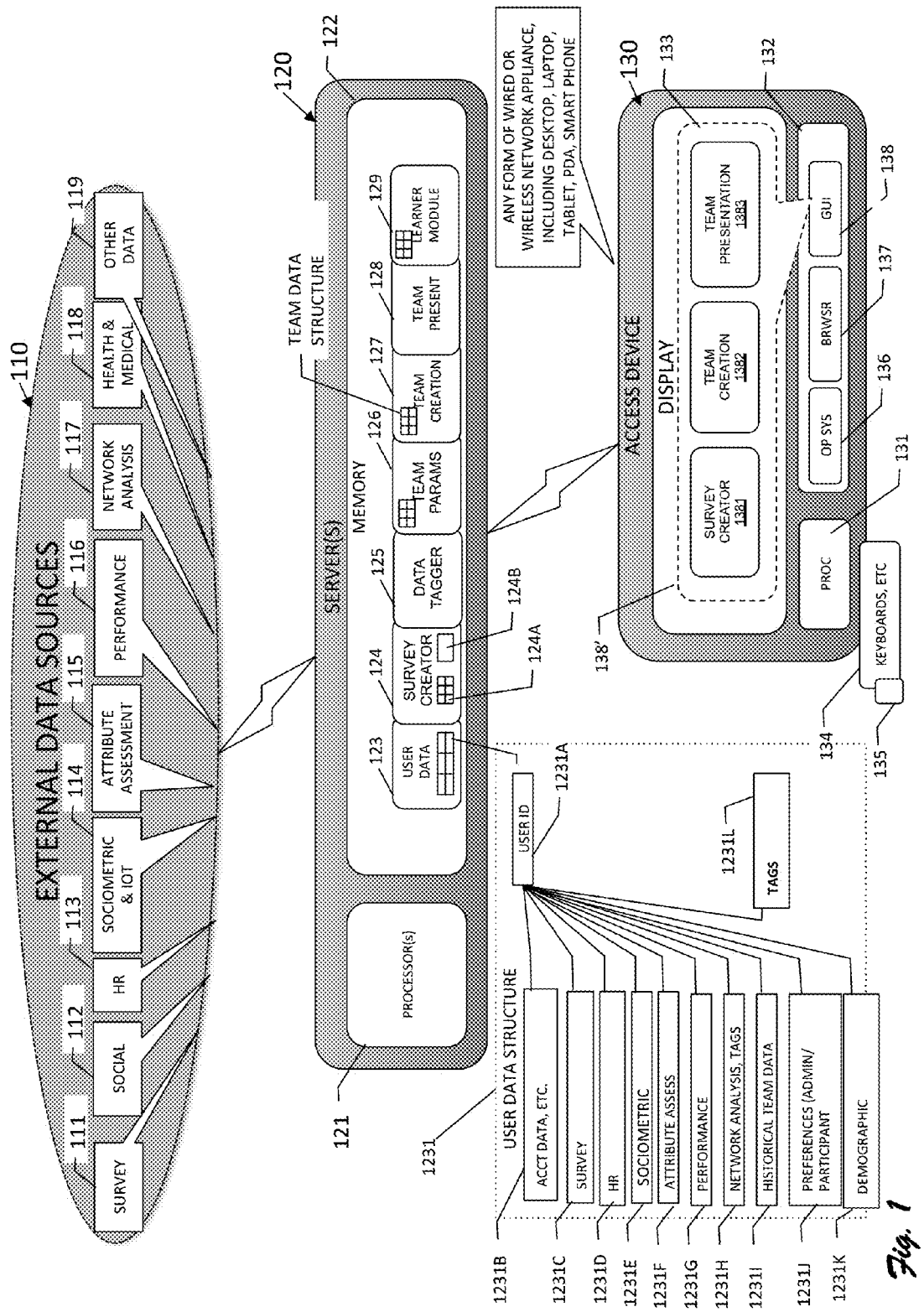
FIG. 1 is a block diagram of an exemplary system or assembly corresponding to one or more embodiments of the present invention.

FIG. 1 shows an exemplary team building system 100. System 100, which takes the exemplary form of cloud-based Service as a Software system used by multiple enterprises, events, and/or individuals, includes one or more external data sources 110, one or more servers 120, and one or more access devices 130.

Exemplary Data Sources

Data sources or databases 110 includes one or more survey data sources 111, social data sources 112, human resource data sources 113, sociometric data sources 114, attribute assessment data sources 115, performance data sources 116, network analysis data sources 117, health and medical records data sources 118, and other data sources 119.

Survey data sources 111 include one or more completed surveys or questionnaires completed by a population of users. Each completed survey or questionnaire includes one or more data structures, with each data structure including a survey identifier, a question identifier, text of a questions or statement associated with the question identifier, and a user response. In some embodiments, additional data regarding users is collected during the survey completion, for example, location, computer type, browser and cookies, which can be used not only in the team formation processes, but also in joint ventures with other businesses.

Social data sources 112 include data, public and/or private, from one or more online social media services for various users or potential users. Exemplary data sources include Excel/Google Sheets, Zapier, Oracle, Peoplesoft, event vendors, Eventbrite, Surveymonkey, Meetup, Facebook, Linkedin, alumni directories, Twitter, browser history, credit reporting bureaus, GPS data, Tower Data/Acxiom, Clearbit, etc.

Human resource (HR) data sources 113 includes employer-retained data regarding a population of former and current employees. Exemplary HR data includes data regarding how a person has performed, what departments or divisions he or she were part of, who he or she worked with or reported to and/or how the company or product performed over time. In some embodiments, it also include compensation data, benefits data, expense data.

Sociometric data sources 114 includes data, public and/or private, from one or more sociometric devices or other Internet of Things (IOT) sensory devices from which social and relational aspects of the wearers are directly indicated or inferable. In one embodiment, sociometric data is provided from a set of one or more sociometric badges (commonly known as "sociometers"), wearable electronic device capable of automatically measuring the amount of face-to-face interaction, conversational time, physical proximity to other people, and physical activity levels using social signals derived from vocal features, body motion, and relative location. These badges are capable of automatically measuring individual and collective patterns of behavior, predicting human behavior from unconscious social signals, identifying social affinity among individuals working in the same team, organization, or general vicinity, and enhance social interactions by providing feedback to the users of our system. In some embodiments, historical geolocation and call data from user smartphones, as well as activity data from fitness and activity-level trackers, for example Fitbit and iWatch, are also used. Additionally, some embodiments include tracking or movement data from employee or conference attendee badges.

Attribute assessment data sources 115 includes one or more data sources or databases including the assessment results and associated assessments for a user population. In some embodiments, the assessments include one or more cognitive, affective, or conative assessment results and associated assessment documents stored in association with user identification and access credentials. Exemplary assessments include IQ tests, Myer-Briggs, Kolbe Index, Strengths Finder, Scholastic Aptitude Tests, ACT, GMAT, LSAT, GRE, 5 Love Languages, E-harmony, Armed Services Vocational Aptitude Battery (ASVAB).

Performance data sources 116 includes one or more data sources or database that store data regarding the performance of members of a user population. In the exemplary embodiment, this includes business, social, financial, athletic performance information.

Network analysis data sources 117 includes one or more data sources or databases that store data regarding social network phenomena that is reflected or evidenced through actual communication network data. For example, in some embodiments, this data included email activity data for members of a population within or without an organization, with the data indicating relationship strength through frequency or infrequency of communications between individuals. Exemplary email data is provided by Outlook, Gmail, Yahoo! mail, Hotmail, Outlook or other public or private individual or private email providers. Some embodiments may also leverage telephone, text, chat, social media postings, and other types of communications transactional patterns and member connectivity embedded within Twitter, Facebook, LinkedIn. Still other embodiments leverage conference room bookings, travel bookings, and other booking or calendar and positional data.

Health and medical records data sources 118 includes any network accessible health and electronic medical records as may be permitted by the specific users within HIPAA (Health Insurance Portability and Accountability Act) guidelines. In the exemplary embodiment, it also includes fitness activity data, such as that collected through wearable devices, such as Fitbit and Apple iWatch.

Other data sources 119 include financial data sources, consumer data sources, census data sources, and Internet browser history data. Financial data sources data in some embodiments includes credit reporting bureau data, public real estate data, and so forth. Census data sources include U.S. and/or international census data. Internet browser history data, including cookies, includes website and webpage URLs (Uniform Resource Locators), Internet Protocol (IP) addresses, associated data stamps, cookies, and so forth. In some embodiments, it may also include browser types, browser preference and security settings, and browser extensions. Media consumption and preference data includes information about user media consumption and preferences, such as book, music, and movie titles and genres, usage statistics, such as most frequently and/or most recently purchased, consumed, or shared content, etc. In some embodiments, this data is provided through media service providers, such as Apple Itunes, Audible, Pandora, Netflix, Spotify, and Amazon.

Data stores 110, which take the exemplary form of one or more electronic, magnetic, or optical data-storage devices, include or are otherwise associated with respective indices (not shown). Databases 110 are coupled or couplable via a wireless or wireline communications network, such as a local-, wide-, private-, or virtual-private network, to server 120, enabling data interchange via application program interface, JavaScript Object Notation, or electronic data interchange, or any convenient or desirable way of communicating data Exemplary Server(s)

Server 120, which is generally representative of one or more servers for serving data in a variety of desirable form, including for example webpages or other markup language forms with associated applets, remote-invocation objects, or other related software and data structures to service clients of various "thicknesses." More particularly, server 120 includes a processor module 121, a memory module 122, a user database module 123, a survey creator 124, a data tagger module 125, a team parameter module 126, a team creation module 127, team presentation module 128, and a learner module 129.

Processor module 121 includes one or more local or distributed processors, controllers, or virtual machines. In the exemplary embodiment, processor module 121 assumes any convenient or desirable form.

Memory module 122, which takes the exemplary form of one or more non-transient electronic, magnetic, or optical data-storage devices, stores user database 123, survey creator 124, data tagger module 125, team parameter module 126, team creation module 127, team presentation module 128, and learner module 129.

Use data module 123 includes user-related data and machine-executable instructions sets for controlling, administering, and managing user accounts and related activities conducted through system 100. In addition to one or more application program interfaces (APIs) (not shown) for accessing external data sources 110 or portions thereof associated with users, user data module 123 includes user data structures, of which data structures 1231 is generally representative. Data structure 1231 includes a user identifier portion 1231A, which is logically associated with one or more data fields or objects 1231B-1231L. one or more of which include not only raw data with associated date stamps, but also in some embodiments associated tags based on the raw data.

Field 1231B includes account related data items, such as user name, password, name, address, organizational identifier(s), credit card information, social media account(s) and access credentials, as well as account identifiers and access credentials for emails, calendars, and so forth that may be used or referenced herein. In the exemplary embodiment, social medial accounts include Facebook, Twitter, LinkedIn, and/or Google+.

Field 1231C includes completed survey data for the associated user. In some embodiments, this survey takes the form of input answers and associated questions. Additionally, each survey is uniquely identified and associated with a user, with each question having a unique question identifier and an associated user answer in its raw form, an associated data stamp with geocoding, and/or a set of tags representative of the raw user answer. In still other embodiments, the unique question identifier is further associated with a question type and/or category, as well as with an indication of the type of event it was used it. In some embodiments, the survey data is provided through a direct API or spreadsheet Field 1231D includes human resource (HR) data including resume data, current and past positions, and other data from human resource data sources 113 for the associated employee. Generally speaking, the HR data (and related tags) encompasses all private company data that a company has regarding how an employee (or consultant) performs, the department or division they are or have been a part of, who they have worked with, and/or performance metrics for company or product line that are working on or have worked on. In some embodiments, the data includes employer-retained data from two or more employers or organizations.

Field 1231E includes sociometric and Internet of things (IOT) data and related tags for the associated person as provided within sociometric data source 114 and/or derived or inferred from it. In some embodiments, this data includes data from one or more wearable and/or mobile devices, including smart identification badges, smartphones, and smart watches.

Field 1231F includes personal attribute assessment data and related tags for the associated person from attribute assessment data 115, and/or summaries of the same. In some embodiments, this includes one or more cognitive, affective, and conative assessments. In some embodiments, it further includes proficiency or competency assessments, ratings, or evaluations in various skills, for example language proficiencies, program language efficiency, golf or bowling handicaps, tennis ratings, and so forth.

Field 1231G includes historical performance data and related tags for the associated person. In the exemplary embodiment, this includes professional and personal data, including for example, data regarding personal resumes, awards, reprimands, successful and unsuccessful teams, groups, companies or divisions of successful and unsuccessful teams, groups, or companies.

Field 1231H includes network analysis data and related tags for the associated person. In the exemplary embodiment, network analysis data includes data regarding email communications or other types of electronically documented or tracked communications or other types of relational indicators between a given user and other users in the team universe (group of people being organized into teams). Some embodiments also use organizational hierarchical relationships. Additionally, the network analysis data also includes date-stamped and/or geocoded tags indicative of other users or people that the user is associated or related to along with associated organizations and events, as well as an indication of the age of the relationship or age of the data indicative of the relationship.

Field 1231I includes historical team data for the associated person. In the exemplary embodiment, this includes actual team identifiers for assigned teams, rosters for those team, results and ratings for assigned teams, date stamps, team performance results (including team ratings). In some embodiments, this data also includes data regarding ratings, performance, and constitution of past teams as well as intra team pairing scores and associated metrics. This data, in some embodiments, is fed forward into the future team formations, facilitating better team formations based on the results of past formations. For example, some embodiments update weights for specific types of data based on particular or aggregate performance based on the performance ratings. Some embodiments may also identify individuals with similar team ratings, for example high team ratings or low team ratings, as templates for identifying other members with extreme positive or negative ratings that may warrant further investigation, exception handling, or system refinement.

Field 1231J includes one or more user preferences for the associated person. In some embodiments, this includes user weightings or other indications for their favorite types of team or team sizes. In some embodiments, this data can be regarded as personal preferences which generally only affect assignment of a small set of users. For example, a user may indicate a negative or positive weighted or ranked preference to be assigned with particular sets of one or more identified people, or with people having a set of one or more attributes, such as introverts or extroverts. In some embodiments, these preferences are more global in nature and set via an administrator or designated team organizer who selects or defines preferences that have an over arching affect on the entire team formation process. For example, some embodiments enable designated administrative users to bias the team formation process to tend toward keeping high performers or geographically disparate persons together on a single team.

Field 1231K includes general demographic profile data of the user. Exemplary demographic data includes age, date of birth, gender, race, ethnicity, nationality, smoking status, marital status, parental status, education level, and income level. In some embodiments, this data also includes height, weight, body mass index, physical performance metrics (batting averages, vertical leap, running speeds or times, religious and political affiliations, food allergies, and dietary preferences. In some embodiments, administrative users (team organizers) may select from a menu of available data to be considered, as well as to define or select weighting for the data.

Some embodiments generally use one or more of the following user-related data items or data type categories, or preferences:

location; age, generation, gender, native language; non-native languages, education level; professional or collegiate fields of study; schools; ethnic affinity; income and net worth; home ownership, home type; home value; property size; square footage of home; year home was built; household composition; anniversary proximity; reside away from family or hometown; friends with someone who has an anniversary, is newly married or engaged, recently moved, or has an upcoming birthday; in long-distance relationships; in new relationships; have new jobs; newly engaged; newly married; recently moved; upcoming birthday; parental status (current, expectant); maternal status and type (soccer, trendy, stay-at-home); political preferences, engagement level; relationship preferences and status (married, divorce, single, domestic partnership, seeking); employer; industry; job title; office type; hobbies and interests; motorcycle ownership status, preferences, history; automobile purchase history, plans, and preferences; auto parts or accessories purchase history, plans, preferences; age of car; organizational size preferences, such as employer organizational size; small business ownership status (yes or no); manager or executive leadership status; donation history (yes or know, type, amounts, preferences; computer operating system preferences (Microsoft Windows Apple OS, Apple iOS, or Android); canvas games; gaming equipment preferences; social media event organizational history, preferences, frequencies; social media payments history, frequency, and preferences; social media page admin experience; social media usage history, social media usage preferences; Internet browser preferences (including security preferences); email service provider; early/late adopters of technology; expat status, expat history; credit union membership status, history, preferences; national bank or regional bank; accredited or unaccredited investor; investment type; number of credit lines; active credit card users; credit card type; have a debit card; carry a credit-card balance; listen to radio; listen to public radio; TV preferences; mobile device preferences (including brand); telecom provider preferences; Internet connection type; recently acquired a smartphone or tablet; internet access preferences; coupon use preferences; clothing preferences; seasonal shopping preferences; alcohol consumption history and preferences; grocery purchase preferences; beauty product preferences and frequencies; over-the-counter medication purchase preferences and frequencies; household product purchase preferences and frequencies; pet product preferences; child product preferences and frequencies; pet preferences, status, and history; shopping history, preferences, frequencies, ranking; frequent shopper; frequent online shopper; restaurant type preferences; retail store type preferences; receptivity to offers for online auto insurance, higher education or mortgages and prepaid debit cards/satellite TV; Length of time in current house or residence; likely to move soon; Olympics fan, football fan, soccer fan, cricket fan, Ramadan observer; frequent work traveler; frequent pleasure traveler; work commuter; vacation preferences; recent travel experiences; travel app usage history and preferences; timeshare preferences.

One of more of these data items can be combined with one or more other data items or data categories described herein.

Field 1231K includes an aggregation of tags based on one or more of the data types for the associated users. In some embodiments, this facilitates team creation based on simply the tags for each of a population of users.

Survey creator module 124 includes one or more sets of machine readable and executable instructions, related data, and associated graphical user interfaces for creation of on- and off-line user profiling surveys or questionnaires that can be used alone or in combination with one or more other forms of user data, such as from one or more external data sources 110, and stored user preferences in the creation of teams from a group of user. More specifically, the exemplary embodiments provides a database or library 124A of questions and/or preexisting surveys that can be accessed via a defined survey creation graphical user interface 124B (described and shown more fully below using FIG. 3) that enables users to select among categories of questions and "drag and drop" questions into a survey template structure. In some embodiments, the survey template is seeded or preset with one or more questions that have been discovered to have a high correlation with positive and negative team performance, thus ensuring that user created surveys are effective in driving optimal team formation. In some embodiments, the questions include or take the form of questions from standardized cognitive, affective, or conative evaluation instruments, such as the Myers Briggs personality assessment.

Data tagger module 125 includes one or more sets of machine readable and executable instructions for tagging survey and other forms of data with one or more meta or category tags based on an evolving library of tags. More specifically, this module automatically 'tags' all data, whether open text, multiple choice survey responses, network data (knowledge and network graph), allowing the system, as further described below, to cluster or define groupings based on semantic or keyword type similarity as well as on similarity of the tags. Additionally, the exemplary system allows advanced business users view one or more of the tags and override the exemplary system recommendations of weights for those tags, making sure that certain 'tags' are more important or less important to manually optimize teams. The weighting of the tags serves only to guide the software in custom team creations. Examples of tagging include meta level categorical tags that allow finding of similarity between users that textual or semantic similarity would otherwise miss. For example, survey, email, or social media data for person 1 may include hiking and skiing as hobbies and data for person 2 may show golfing and sailing as hobbies. The exemplary system would apply a tag such as outdoor activities to both persons, enabling the system to find commonality or similarity that would otherwise not have been visible. Some embodiments may provide a dictionary that looks at the definition of underlying terms to facilitate this tagging, using relatively rare or significant terms within definitions as proxies for meta level categories. For example, definitions for the terms baseball and football would generally include the term "sport", and thus be associated with a meta tag of "sport". The definitions may also include the term "team" or "American."

Team parameter module 126 includes one or more sets of machine readable and executable instruction and associated graphical user interfaces for accepting team organization rules, weights, or parameters to be used in defining a set of two or more teams from a group of users. More specifically, the exemplary embodiment allows authorized users, for example, business leaders, conference organizers, professors, team leaders, or members of a team formation population, to set particular preferences regarding the computed similarity or dissimilarity of team mates, and/or to set weights governing or set rankings indicating the desired level of influence of various types of data or various business rules. In some embodiments, the module includes data structures which store team creation parameters for particular team organizers, enabling these parameters to recalled for future re-use or avoidance.

Team creation module 127 includes one or more sets of machine readable and executable instructions for defining a set of two or more teams from a group of users based on one or more types of available data and business rules and one or more team building algorithms or methodologies. The exemplary embodiment uses a four-step process. First, it determines mathematical distance between every pair of members in a group, based on the available data for the group members. Second, it uses the distances within robust hierarchical clustering or other types of clustering or grouping algorithms to form a set of teams, seeking for example to iteratively minimize the average separation distance or maximize similarity between members of every team. Third, it then refines or balances the groups to meet desired team size constraints and other business rules defined based on personal or group knowledge regarding relational dynamics and/or authorized user/business owner preferences, effectively overriding the clustering results. For example, if the clustering shows person 1, 2 and 3 should be together, but a business user determined rule indicates that person 1 and 2 should not be together on the same team, the exemplary system rebalances the teams respecting this separation constraint. Finally, the exemplary system learns over time. Specifically, the exemplary system enables end users to rate the 'quality' of the team that they are on, for example on a five-, ten-, or hundred-point scale at a conclusion of an event, at a specific point in time, such as 10 days after formation, or after a predetermined number of meetings, or on an ad hoc basic if one or more team members or administrative observers request a spot check. The system also lets the business user (host or owner of the team) to rate the outcomes of the team. The system can also import long-term data on team performance. For example, if person 1, 2 and 3 were put together and 6 months later, they were the highest performing team in a company, the system would learn from that matching to then improve matching in the future by looking for opportunities in future data sets of people with similar data as the 1, 2 and 3 people together. Similarly, if persons 4, 5, and 6 were the worse performing team the system would learn from this as well and inhibit clustering of similar people into a future team.

Team presentation module 128 includes one or more sets of machine readable and executable instructions and graphical user interfaces for presenting, displaying, transmitting, printing or otherwise outputting teams defined by team creation module 127.

Learner module 129 includes one or more sets of machine readable and executable instructions for improving the performance of the team presentation module 128 over time and across multiple populations of teams from differing organizations.

Exemplary Consumer Access Device(s)

Access device 130 is generally representative of one or more access devices. In the exemplary embodiment, access device 130, like access device 110, takes the form of a personal computer, workstation, personal digital assistant, mobile telephone, kiosk, or any other device capable of providing an effective user interface with a server or database. Specifically, access device 230 includes a processor module 131, a memory 132, a display 133, a keyboard 134, and a graphical pointer or selector 135. (In some embodiments, display 133 includes a touch screen capability.)

Processor module 131, which includes one or more processors, processing circuits, or controllers, is coupled to memory 132. Memory 132 stores code (machine-readable or executable instructions) for an operating system 136, a browser 137, and a graphical user interface (GUI) 138 (defined in whole or part by various modules within server 120). In the exemplary embodiment, operating system 136 and browser 137 not only receive inputs from keyboard 134 and selector 135, but also support rendering of GUI 138 on display 133.

Upon rendering, GUI 138, shown on display 133 as GUI 138', presents data in association with one or more interactive control features (or user-interface elements). In the exemplary embodiment, each of these control features takes the form of a hyperlink or other browser-compatible command input, and provides access to and control of various regions of the graphical user interfaces described herein.

More particularly, GUI 138 includes, among other things, a survey creator portion 1381, a team creation controller portion 1382, and a team presentation portion 1383, which are governed by and interact with various portions of server 120. Survey creator portion 1381 which enables select users not only to define surveys using libraries of survey questions as well as defining new questions, but also to control administration of the surveys to small and large populations of users. Team creation controller portion 1382 allows users to control and select among various parameters, for example weights and data input types, governing the team creation logic and processes. Team presentation portion 1383 provides one or more interactive display options, such as charts and network graphs of teams and interrelationships. In some embodiments, various portions of survey creation portion 1381, team creation controller 1382, and presentation portion 1383 are varied in response to a user selection of a team type or context, or team context, such as corporate context, event context, or educational context, which govern presentation of survey, creation, and presentation options.

Exemplary Method(s)

Figure 2:
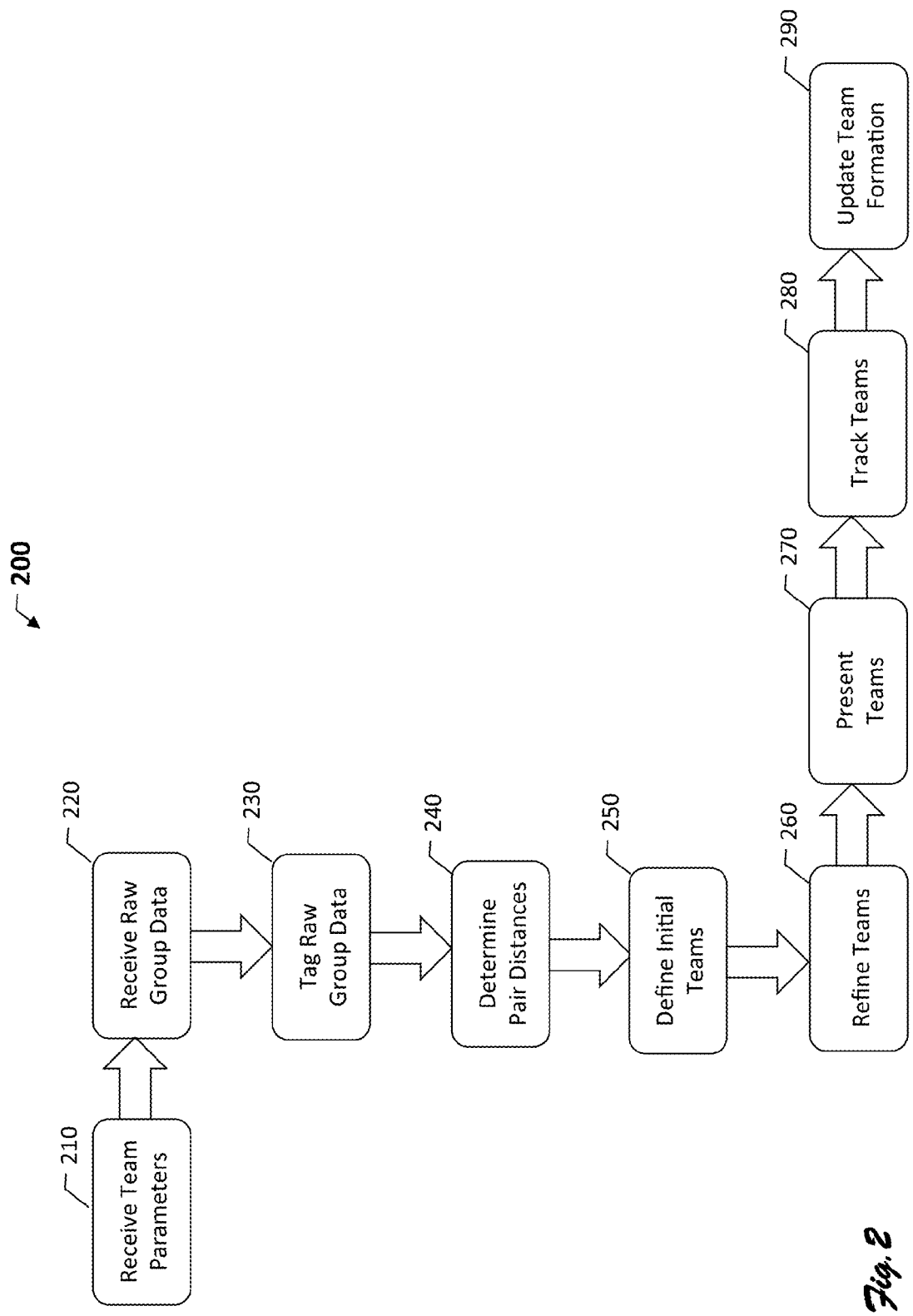
FIG. 2 is a flow chart of an exemplary method corresponding to one or more embodiments of the present invention.

FIG. 2 shows a flow chart 200 of one or more exemplary methods of operating a redemption code management system, such as system 100. Flow chart 200 includes blocks 210-299, which are arranged and described as a sequence in the exemplary embodiment. However, other embodiments are not similarly limited. For example, in some embodiments, the order of two or more blocks, such as blocks 210 and 220, are reversed or other otherwise reordered. Other blocks may also be reversed in some embodiments. Moreover, still other embodiments implement the blocks as two or more interconnected hardware modules with related control and data signals communicated between and through the modules. Thus, the exemplary process flow applies to software, hardware, and firmware implementations.

At block 210, the exemplary process begins with receiving user input defining one or more aspects of a team formation. In the exemplary embodiment, this entails collecting information for example via a graphical user interface, defining a team size, and optionally one or more topical points of interest. Execution proceeds to block 220.

Block 220 entails collecting user data for a population of users from external data sources. In the exemplary embodiment, this entails collecting not only survey data, but also network analysis, expertise, social, personal, and other forms of data, such as those provided by external data sources 110. For survey data, the exemplary embodiment provides user access to a survey creation tool, such as survey creation module 124 of system 100 (described below). However, some embodiments distribute predefined surveys to members of the population designed for team formation. Execution proceeds to block 230.

Block 230 entails tagging the collected data with one or more tags. In the exemplary embodiment, this entails operation of data tagger module 125. Tagger module 125 tags the data based on a library of tags, which includes tags and tag identifiers associated with categorical tags as well as date stamps. Tags are also associated logically with user identifiers as collected data associated with a given user is tagged. In some embodiments, tag or tag identifiers are also further associated with administrative users identifiers and sets of weights, enabling users to weight usage of newer tags over older tags, or tags derived from one type of data more than another. Execution proceeds to block 240.

Block 240 entails building distance matrix by determining distance between pairs of members in the team formation population. In the exemplary embodiment, the matrix can be depicted as a two dimensional array. For a simple case with a team formation population of 5 users, the array can be depicted as

|    | P1  | P2  | P3  | P4  | P5  |
|----|-----|-----|-----|-----|-----|
| P1 | 0   | D21 | D31 | D41 | D51 |
| P2 | D12 | 0   | D32 | D42 | D52 |
| P3 | D13 | D23 | 0   | D43 | D53 |
| P4 | D14 | D24 | D34 | 0   | D54 |
| P5 | D15 | D25 | D35 | D45 | 0   | where the 5 users are designated as P1, P2, . . . , P5, and Dij indicates the computed distanced between Pi and Pj, with i,j ranging between 1 and 5 inclusive.

In the exemplary embodiment, the Dij is generally a weighted sum of the distances computed for each type of data associated with the users. This generally can be expressed as $$D_{i,j} = \sum_{n=1}^{N} W_n(t) * D_{n,ij}, \text{ over all } i, j \text{ pairs}$$

where N is the total number of different types of data, Dnij denotes the distance for pair PiPj computed based on the n-th type of data, and Wn(t) denotes the weight (in effect at time t) to be applied to the n-th data type. The time dimension is explicitly denoted here to reflect that the weights, in some embodiments, are updated over time to improve the team creation process based on measured or reported team performance relative to a desired standard. For example, in one embodiment, users rate teams on a 1-5 point system, with 1 being lowest performance and 5 being highest, and the system computes difference between a desired average rating of 5 and the average rating for a set of teams produced by a given team creation session or across multiple team creation sessions, and increases or decreases weights by for example 0.1, 0.2, or 0.3% or some other amount, in an attempt to drive the performance rating of future team assignments toward 5.

In some embodiments, the weights allow certain data, for example, survey results to be emphasized relative to other data types. Thus, if the exemplary embodiment uses survey data in combination with social media data and HR data, it would compute distances between each pair of members for the survey data, for the social media data, and for the HR data, before computing a weighted sum, for example an average distance, based on all three types of data being considered.

In some embodiments, user data is used in a raw and a tagged form, with the distances Dnij computed as the weighted sum, for example, average of a distance computed based on the raw (untagged) form of the user data and a distance computed based on tags of the user data.

$$D_{n,i,j} = W_R(t) * RD_{n,ij} W_T(t) * DT_{n,ij},$$

where $W_R(t)$ denotes the weight at time t for raw data; $RD_{nij}$ denotes the raw-data distance between pair PiPj for the n-th data type; $W_T(t)$ denotes the weight at time t for the tagged-data distance; and $DT_{n,i,j}$ denotes the tagged data distance between pair PiPj for the n-type of data. In some embodiments, the total distance Dij is an average or weighted sum of a total raw based distance and a total tagged based distance determination.

For the survey data, the exemplary embodiment computes the distances between members Dij in the following way. Assuming there are 4 questions Q1 to Q4 on a survey, with the questions having respective associated weights w1 to w5, for every two members Pi and Pj, the exemplary embodiment computes a distance matrix at question's response level. For a four-question survey, the matrix would take the form

| Question | Q1  | Q2  | Q3  | Q4  |
|----------|-----|-----|-----|-----|
| Distance | dq1 | dq2 | dq3 | dq4 |

The distance between P1 & P2, $D_{P1,P2}$ is expressed as $$D_{P1,P2} = \sum_{i=1:4} w_{qi} * d_{qi}$$

where $w_{qi}$ denotes a default or authorized user's determined weight associated with ith question qi and dqi is the distance between the answers that P1 and P2 gave for the i-th question. (In some embodiments, the weight is input through a graphical user interface input, for example, a slider, dial, radio button, drop-down menu, or input field, as further described below.) Thus, for every pair PiPj, the system individually quantifies differences between their answers for each question and the overall distance between a pair for a given survey is a weighted sum of distances between their individual responses.

The computed distances between individual survey responses are a function of the type of question and whether the team organizer desires for the question to be used to promote users with similar responses to be on the same team (combination) or different team (separation). (In the exemplary embodiment, this team organizer preference for use of the survey questions is established through selection of weights in the team creation interface (FIG. 4), which is described below.) For single-choice-combination type questions, the exemplary embodiment sets the distance to 0 if P1 and P2 responses match; otherwise, it sets the distance to 1. For a single-choice separation-type survey question, the exemplary embodiment sets the distance between two users P1 and P2 to 0 if the responses differ, and to 1 otherwise. For time-zone questions, the exemplary embodiment defines the distance as 0 if the P1 and P2 time zone responses are the same. If the responses differ by 1 hour, the distance is 0.2; if they differ by 2 hours, the distance is 0.4, and if they differ by more than 2 hours, the distance is 1.

Multi choice question (tags)—Combination: In determining the distance between responses for this type of question, the exemplary embodiment, tags the responses for each response, and then creates a document term frequency (DTF) matrix for the tags of each response. Next, the exemplary embodiment computes Jaccard similarity which is denoted as SimJaccard. Jaccard similarity is also known as Jaccard index or Jaccard similarity coefficient and defined as size of intersection of two finite sets, divided by the size of the union of the two sets. The similarity is defined as 1 if the two sets are empty, giving the similarity a range of 0 to 1, inclusive.

Next, the exemplary embodiment determines a custom similarity metric SimCustom between the responses, which is defined as SimCustom=numberOfCommonTags/AvgNumberOfTagsPrResponse, where numberOfCommonTags denotes the number of tags two user responses have in common, and AvgNumberOfTagsPrResponse denotes the average number of tags per response. This normalization is done to avoid unnecessary penalization for people who are providing more information, such as hobbies, in their responses.) To ensure that appropriate significance or weight is given to perfect matches, the exemplary embodiment then redefines SimCustom as SimCustom=min(SimCustom,SimJaccard)

before finally computing Similarity according to

Similarity=min(0.7*SimCustom,0.3*SimJaccard), where the weighting is meant to strike a balance between penalizing long answers that have more tags and thus have more mismatches) and rewarding perfect matches. Then using this value of similarity, the exemplary embodiment, computes the distance between the P1 and P2 responses as distance=1−Similarity.

For multiple-choice separation question, the exemplary embodiment computes similarity as above using SimJaccard and SimCustom over document term matrix). However, distance is defined as distance=Similarity, rather than 1−Similarity.

The exemplary embodiment also allows for marketplace ask/offer types of survey questions, which allow users to make free form requests or "ask" regarding their specific needs or desires that they would like help with, as well as to offer or volunteer certain skills, ideas, information, experiences. With these type of questions, the intent embedded within the exemplary embodiment is to form teams such that there is mutual ask and offer overlap within a team. In other words, each ask in the cumulative set of asks for all the members of a given team should ideally be matched to a corresponding offer within the cumulative set of offers for all members of that given team. To this end, the exemplary embodiment first measures similarity of P1's ask and P2's offer, then similarity of P2's offer to P1's ask. It then calculates average of the two. Generally, this can be expressed as distance=0.5*[Sim(P1 ask,P2 offer)+Sim(P2 ask,P1 offer)]

where Sim(X, Y) denotes a similarity measurement function for the two inputs X and X. In some embodiments, the similarity measurement based on tags or based on full text of each of the two ask-offer pairings under consideration. Similarly, other types of questions that allow open text answers are tagged to enable use of similar Jaccard type similarity and distance computations between users. Other types of structured and unstructured data from various sources is similarly used to compute distances. For example, network analysis data is used to derive tags for the relational connections of the users within the team formation population, with the tags being associated with respective users, enabling the creation of network graphs for the team population, as well as for computing the similarities between users based on numbers of tags they share or do not share in common. In the exemplary embodiment, the general object with this type of data is to be able to enrich teams with diversity, so that people get to meet new people or meet people who have common friends. The exemplary computation for similarity is dependent on the order of the relationships. For $1^{st}$ order relationships, in determining distance between P1 & P2 (any two members) against network question, the exemplary embodiment checks the list of people who P1 claims to know or is deemed to know based on analysis of network data, and if the system finds name of P2 in that list, a similarity is set to 0.5 and then the system checks list of persons which P2 claims to know or is deemed to know based on network data, and if that we find name of P1 than we add 0.5 to similarity for the pair. For second order relationship (that is, P1, P2 have common friend but they don't know each other), the exemplary embodiment reverses the graph only one level, first checking list of people who P1 claims to know and once we know that P1 doesn't directly know P2, then for each of those in list, the exemplary embodiment checks if any of them knows P2. If yes, the system sets similarity to 0.5 for second order relationship. If additional third and further levels relationships are used, the exemplary embodiment computes the similarity as a weighted average of all the lower levels, with the weights decreasing for each successively lower order.)

For network analysis, the exemplary system treats 'communities' or 'degree centrality' or most common network analysis metrics in the same exact fashion as it treats $1^{st}$, $2^{nd}$, etc. degree relationships. For example, if a person is in community 32 (a common occurrence in network analysis) the exemplary embodiment will automatically place them in a combination of people in that community or separate them per the administrators business rules (slider values or other inputs governing team formation) The system also learns over time the scoring of the teams based on the distance between the relationships of the people and the network analysis scores.

In some embodiments, the distance calculations are based on whether the team organizer desires that teams be organized to promote users with existing relationships being on the same team (that is, in same community) or on different teams to, for example, promote cross-pollination of information or ideas. In some embodiments, the tags are date stamped according to the date added to the system or other timing data from the source network analysis data, enabling the system to weight older or newer relationships more or less in their impact in computing the distance between pairs of users.

Other types of relational data are used similarly. Social media data and other types of data are seen as an additional category for the team owner/business user to decide if the data should be used to combine or separate people based on the data. For example, if team population members have similar content on Twitter or if they worked for the same company in the past on LinkedIn, team organizers may decide whether to separate or combine these users through their weighting of the data. (In some embodiments, team organizers may simply select a desired degree of separation or combination on a slider or pull-down menu or other graphical input feature, for each data type or in an overarching way to enable formation of teams for maximum separation or maximum combination (commonality), or at a point in between.)

For open text type questions or data, the exemplary embodiment uses an open source tagging algorithm to retrieve important tags from the text response. Then the responses are treated as multiple choices questions, with distance determined as already described.

In some embodiments, administrative users are allowed to customize the weightings of the survey questions answers using a graphical user interface slider or radio dial. To accommodate this type of weighting, one embodiment redefines the survey-based distance between any two users Pi and Pj as $$D = \sum_{i \in Q} d_i * 10^{(|W_i|-1)}$$

where di is distance of the pair corresponding to i-th question; Wi is the slider weight of ith question; and Q denotes the set of survey questions, so if there are 5 questions than i varies from 1 to 5. Execution then continues to block 250.

Block 250 entails forming optimized teams based on optimization of some form of team member separation or similarity parameter. In the exemplary embodiment, this entails using robust hierarchical clustering to form teams (without regard to user specified team size) using a hierarchical clustering algorithm. Other embodiments may use other types of clustering, such as k-means clustering or adaptive clustering. See for example U.S. Pat. Nos. 9,020, 271 and 8,712,935 which are incorporated herein by reference as alternative forms of clustering used in some embodiments.

To avoid bias from outliers the exemplary embodiment identified and removes outliers before executing the clustering procedure to reduce potential for skewed formation of groups. In the exemplary embodiment, outliers are identified based on the distance measures for the participants, for example their average distance measurements or an average of a subset of distances measurements, for example two, three, or four largest In some embodiments, outliers are determined as those users who have less data available than others, for example some users may not have completed a survey, may have skipped one or more survey questions, or may not have allowed access to one or more other types of data available. In these cases, the users are excluded from the clustering process and considered for assignment separately.

Additionally, in some embodiments, the clustering process entails hundreds of thousands of iterative team formations in working toward an optimal similarity metric with each team. In some embodiments, convergence to an optimal set of clusters is enhanced with an learning approach to determine which pairings of users are likely to yield improved metrics. Some embodiments also use a randomization approach that entails randomly picking pairs of clusters and attempting successive swaps of members in the pair of clusters to reduce overall average distance between members in each of the two clusters. In other words, these embodiments search for a swap or trade that reduces overall cluster error. Also some embodiments also check, for example after every 5000, 10,000, or 20,000 or other number of iterations, whether the clusters have improved, that is been further optimized, since the prior check. If there has been improvement, the clustering is allowed to continue. To reach optimal configuration of clusters in the lowest number of iterations, some of these embodiments weight the randomization toward selection of clusters based on average cluster error, with probability of choosing a given cluster being proportional to its average cluster error, meaning that the higher the average distance in a cluster, the higher the probability of it being chosen. Moreover, to avoid getting stuck in local optimization, some embodiments use a simulated annealing approach, so in initial cluster trials, swaps are allowed even if that increases error. However, as iterations continue the probability of swaps increasing error decreases, after which some of these embodiments only allow greedy swaps, that is, swaps that improve the clusters. Exemplary execution continues a block 260.

Block 260 entails balancing or resizing the teams to meet the desired team size constraints. In the exemplary embodiment, this entails identifying a set of one or more deviant clusters, that is clusters which are undersized and oversized relative to the desired team size. After identifying the deviant clusters, the exemplary embodiment follows a procedure that entails removing assigned member from oversized clusters into undersized clusters one at a time based on the pair distances computed at block 240. More specifically, the exemplary embodiment looks at each oversized cluster and seeks to reassign excess members to undersized clusters in a way to minimize the overall per cluster error among the deviant clusters. The distance matrix determined above to take decisions as to which elements to add (while filling under sized clusters) and which team members to remove (while filling oversized cluster), overall the optimization is done to minimize overall per cluster error in taking such decisions and maximizing the team performance based on history and the 'sliders'/business rules/priority of data types that the organizer selects.

In the exemplary embodiment, other business rules, both systemic or user driven can also be applied during this process block. For example, some team administrators may have indicated during their team configuration process that certain users are to be placed on the same team or to be excluded from being on the same team. Similarly, certain users may be provided certain positive or negative preferences for team assignments with certain types of people, or with people have certain attributes or prior experiences. The rules may be organized and prioritized in a variety of ways. After formation of the teams, execution proceeds to block 270.

Block 270 entails presenting a set of two or more created teams. In the exemplary embodiment this entails presenting the teams assignments as a list of people. It allows the list of people on each team to be reviewed by the organizer. It also presents the organizer with a 'star' quality to share the quality the computer thinks the team has based on all historical data and business rule/data priorities that the administrator has set. The results can also be viewed as one or more interactive network graphs with selectable nodes, as described below with aid of FIG. 6. In some embodiments, the interactive graph enables users to select a member and drag and drop them to another team, with the system automatically responding via removing one member from the increased team to the reduced team, or reassigning one or more other members on other teams to ensure an optimal formation based on the user change.

Block 280 entails tracking performance of the team . . . . In the exemplary embodiment this entails collecting data regarding team performance, such as in response to survey response data from team members, and/or data regarding external observations or measurements of team performance collected directly from other data sources over time. The collected data is associated with a unique team identifier and stored in association with the user data for each of the team members for use in further team formations involving the given users. In some embodiments, the team identifiers, performance ratings, specific pair distances, and optimization metrics for the team are stored to enable system user of the performance in other team formations involving different users and different organizations.

Block 290 entails updating team formation parameters based on performance data. In the exemplary embodiment this entails adjusting one or more weights for certain tags or data types, and/or creating one or more rules regarding assignment of certain types of users to the same or different teams. For example, if one or more users with particular distances measures were teamed together and the team performed in top quartile or bottom quartile or top decile (10 percent) or bottom decile (10 percent), some embodiments store the attributes of those teams as a part of a separate data structure and seek to mimic or avoid the distance measures and data type clusterings of those groups in future team formations. Some embodiments leverage objective performance measures, such as stock or bond price; daily, weekly, monthly, quarterly, or annual sales, profits, customer retention, product defects, etc. In general, any type of trend data affected or influenced by team performance can be measured.

Exemplary Graphical User Interfaces

Figure 3:
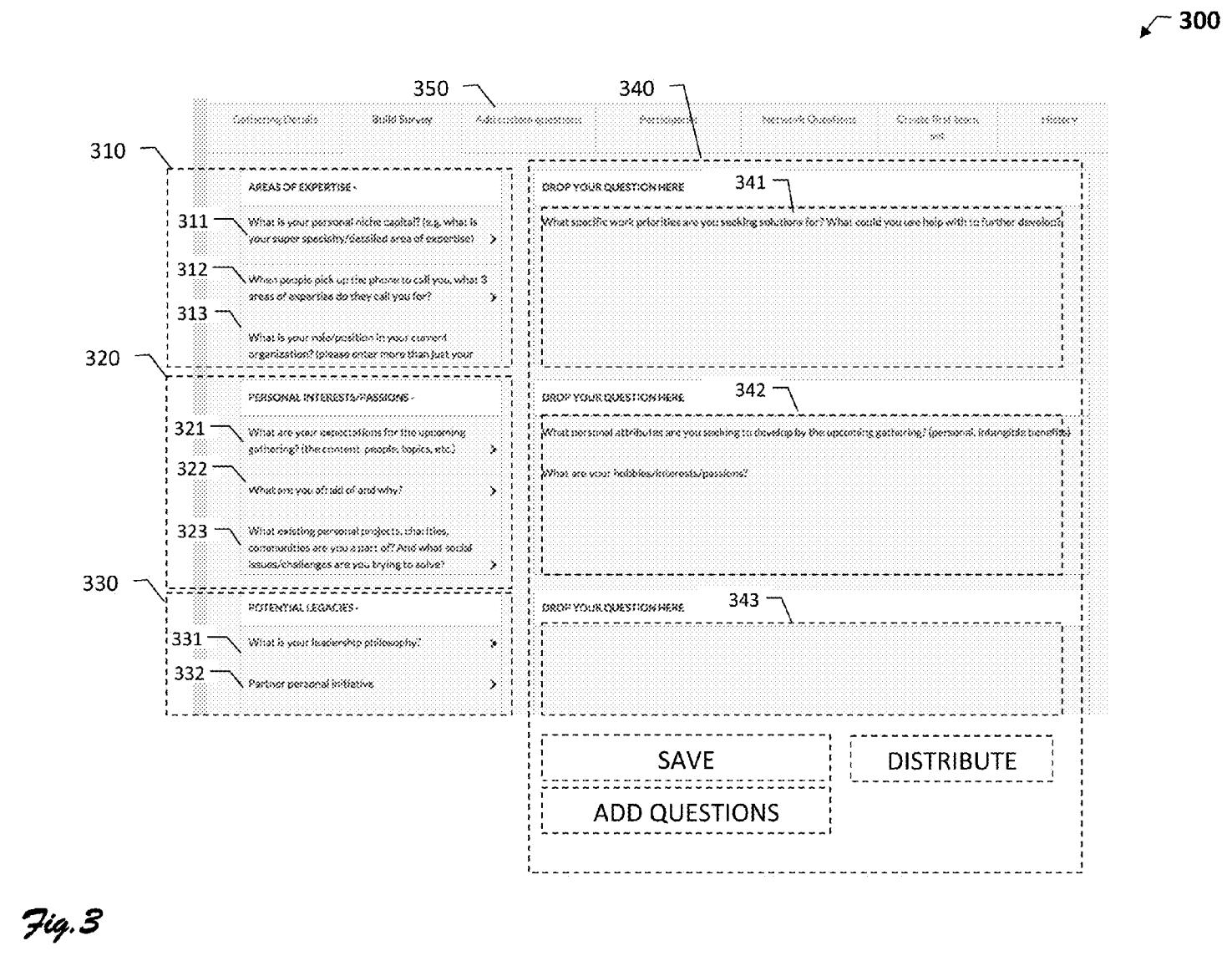

FIG. 3 shows an exemplary graphical user interface 300 for building a user survey to collect information from a population of users to be organized in a team. The users may be students at public or private educational institution, conference or convention attendees, employees of a common organization, etc. Interface 300 includes an expertise question region 310, a personal interests question region 320, a legacy question region 330, a survey display region 340, and a custom question region 350. Expertise question region 310 includes selectable predefined questions 311, 312, and 313, which can be selected and dragged to a survey question region 341 to visually indicate their selection for inclusion into the survey 340. Similarly, personal interest question region 320 includes selectable predefined personal interests or passion related questions 321, 322, and 323, which can be selected and dragged to a question drop region 342 to visually indicate their inclusion into survey 340. Legacy question region 330 includes selectable predefined leadership and legacy questions, such as exemplary questions 331 and 332, which can be selected and dragged to a question drop region 343 to visually indicate their inclusion into survey 340. Survey region 340 also includes an add question button 344 which allows a user to invoke display of a screen offering other types of predefined questions, and respective save and distribute buttons 345 and 346 which respectively allow saving the survey for further modifications, and electronic distribution of the survey to one or more users in a team formation population. Custom question button 350 allows users to define custom questions. Also some embodiments may include weight input or selection features, enabling users to assign weights to particular questions or categories of questions.

The exemplary embodiment provides a set of predefined questions which are stored in memory and have been discovered to be exceptionally and unexpectedly valuable in developing high performance teams as compared other questions. These questions, which are estimated as being 5-10 times more effective than other types of questions, include:

What are your expectations for the upcoming gathering? (content, people, topics, etc.)
What are your hobbies/interests/passions?
What is your leadership philosophy?
What is your micro-niche? i.e., What is your specialty at work? Please be very specific. For example, rather than simply entering 'project manager,'—please enter a more detailed description, such as Six Sigma Black belt specializing in Agile . . . .
What is your most powerful personal epiphany or discovery?
What existing personal projects, charities, communities are you a part of?
And what social issues/challenges are you trying to solve?
When people pick up the phone to call you, what 3 areas of expertise do they call you for?
What are the traditions from your upbringing that you found valuable as a child that you continue to practice today?
What are the specific challenges that you would like to explore during this session?
What is your 'personal initiative'? (E.g. what are you adamantly working on either personal or professional that will be your cause/passion/goal for multiple months or years?)
What personal attributes are you seeking to develop during the upcoming gathering? (personal, intangible benefits)
What are you afraid of and why?
What trends/organizations/technology/startups/agencies etc. do you follow closely and/or are affiliated with?
'No legacy is so rich as honesty' William Shakespeare—What will your legacy be?
If you had unlimited funding, what would you do?
What is your most memorable experience?
What is the 'elephant (gorilla) in the room' at this gathering?
What is the most meaningful compliment you have received?
List three diseases/health conditions that are of interest to you
What is your 'ask' from your peers? (E.g. What do you need help with? Personally or professionally? For example, 'I need help developing an agile marketing roadmap for a consumer product launch both online and offline.')
What is your 'offer' to your peers? (E.g. Just like you 'asked' for help, what do you have to offer that you are skilled at both personally and professionally that you could offer others in need? For example, 'I am a Google SEO marketing expert and have been developing agile business solutions for 25 years.')

Figure 4:
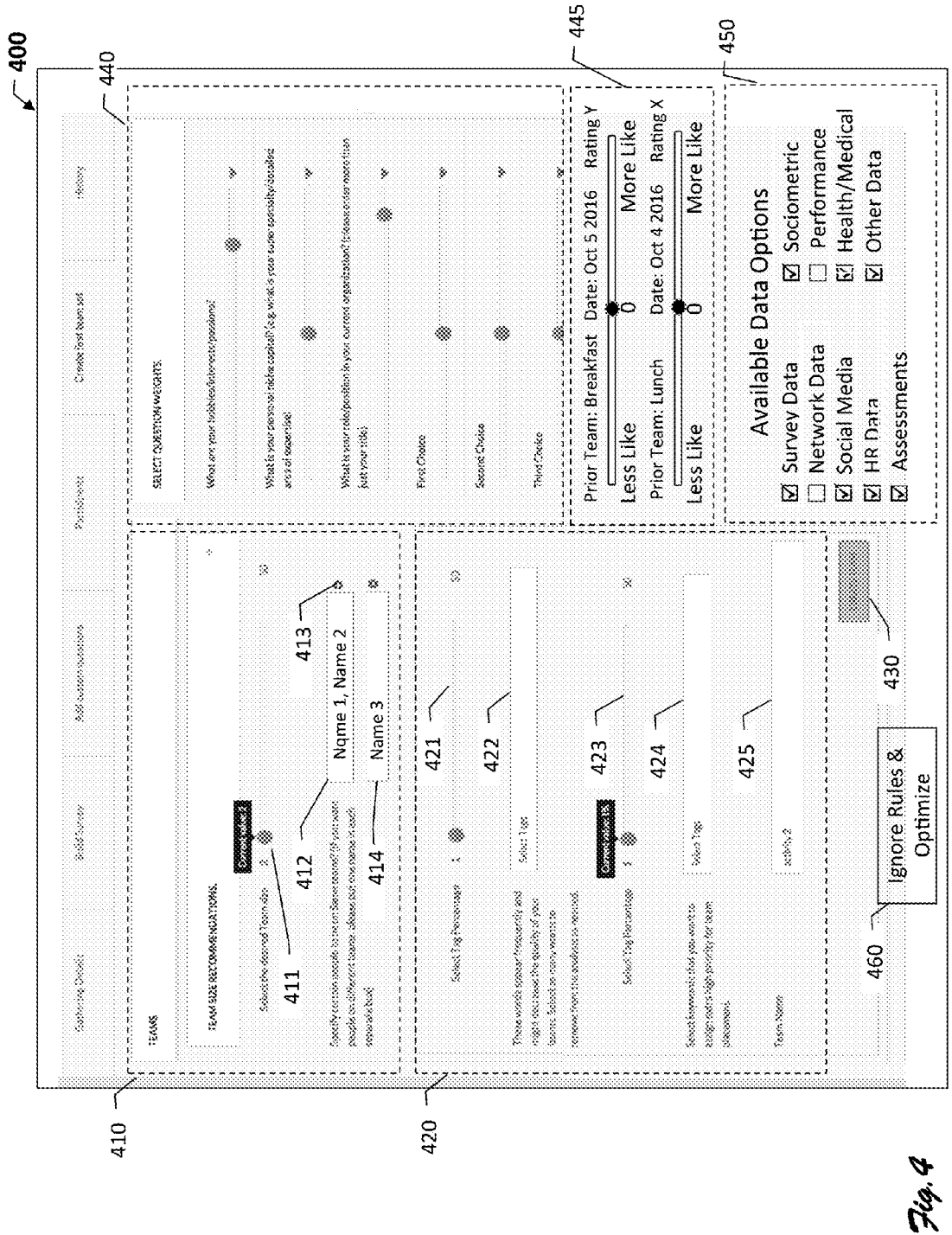

FIG. 4 shows an exemplary team formation graphical user interface 400 which enables authorized users, such as team organizers, to define various parameters governing operation of team creation module 127. In particular, interface 400 includes a team definition region 410, a tag control region 420, a creation command button 430, a question weighting region 440, a data selection region 450, and an ignore rules command button 460.

Team definition region 410 includes a team size selection feature 411, for example, a slider, enabling selection of teams from 2 to half the size of the team formation population, which itself is unlimited. In some embodiments, the upper limit of the selection range is set to half of the size of the team formation population. The user can also indirectly set team size by selecting or inputting the number of teams. For example if there were a team formation population of 109 people and the business requirement was 10 teams, the exemplary system would define nine teams of 11 people and one team of 10. Alternatively, a user requesting 10-person teams would cause formation of 10 10-person teams and one 9-person team. Region 410 also includes an assignment override region 412 for overriding optimized team assignments for select members of the team formation population. The override can take the form of assigning certain members to be together on the same team and/or to preventing certain members from being assigned to the same team. In particular, users may enter the name of two or more individuals into region 412 to define that these users are to be assigned to the same team. Region 413 allows users to add an additional input field, such as input field 414, where additional names which are to be assigned to teams different from other uses listed in other fields of this section. For example, as shown, the user corresponding to Name 3 will not be assigned to a team that includes users Name 1 and Name 2.

Tag control region 420 includes a tag slider region 421, a tag selection region 422, a tag viewing region 423, and a tag selection region 424. Tag slider region 421 is operable to show more/less tags for viewing (some data has thousands of tags and this allows more user friendly selection). Tag selection region 422 is operable so the system knows which specific tags the user wants to prioritize—they click on the tag itself to set it as a prioritization. A tag viewing region 423, a tag selection region 424.

Regions 422 and 424 enable selection or setting of a specific tag or multiple tags for an overall tag weight in the computation of pair distances used within the algorithms of team creation module 127. Region 422 allows removal or decreasing the importance of a specific tag. For example, if one business unit is creating teams and there is an industry specific term that appears repeatedly (such as computer programming if it is a computer programming company) the administrator can remove that tag from being factored in creating teams. Tag exclusion region 422 enables input or selection of tags for exclusion from use in the team creation process. In the exemplary embodiment, the candidate list based on the frequency of occurrence of the tag within the data for the team formation population. For example, tags that have a high occurrence frequency are generally considered likely to decrease quality of team assignments, and are therefore good candidates for exclusion. The converse is also true for region 424 where tags of unknown importance to the system can be significantly increased by the business user. Region 425 allows the user to name the team that they are creating. For example, if team organizing user is making a breakfast team, he or she can save it that way, and the system then remembers and treats it as new data so teams later in the day can be created with the breakfast teams in mind.

Question weighting region 440 includes one or more sliders or other input features, enabling users to assign or otherwise select weights to survey questions responses. In the exemplary embodiments, the sliders allow the survey question responses to be used to promote separation or combination (heterogeneity or homogeneity) among team members by setting the slider position to left of center for diversity (negative) or right of center for similarity (positive), and in the middle for a neutral position. The distance the slider is from the middle position determines the absolute value of the weight applied to the responses to the corresponding question in the distance computations at block 240 in FIG. 2. The positive or negative sign of the weight, determined from the slider position determines in some cases as noted above determines how the distance is computed.

Some embodiments also include a history region 445, which enables users to select a prior team for a given team formation population and then direct formation of new teams with the prior team assignments being used as weighted data within that new team formation process, just like in other data, such as social media or performance data. In other words, new teams can be formed in a way to take account previous teams. For example, if an organizer created breakfast teams, a slider associated with that prior team is presented within the interface, allowing the user to selectively weight whether the value of the breakfast team assignments in creating a new team. In some embodiments, the breakfast team can be weighted to ensure that the new teams are made to maintain some level of continuity with the constituents of the breakfast team or to different than the breakfast team so to the maximum extent possible no two people that were together on the breakfast team are on the same new team.

Still other embodiments include a data type selection region 450 listing available data types and enabling users via corresponding check boxes, radio buttons, or other selection or input features to select which of the available data types to use in determining optimal teams. In one embodiment, the checked data types are by default incorporated with equal weighting into the team formation computations. However, in some embodiments, users may double click or right click on an individual data type to set a weight for the corresponding data type, for example, using sliders as described above or using other types of interactive input features.

Figure 5:
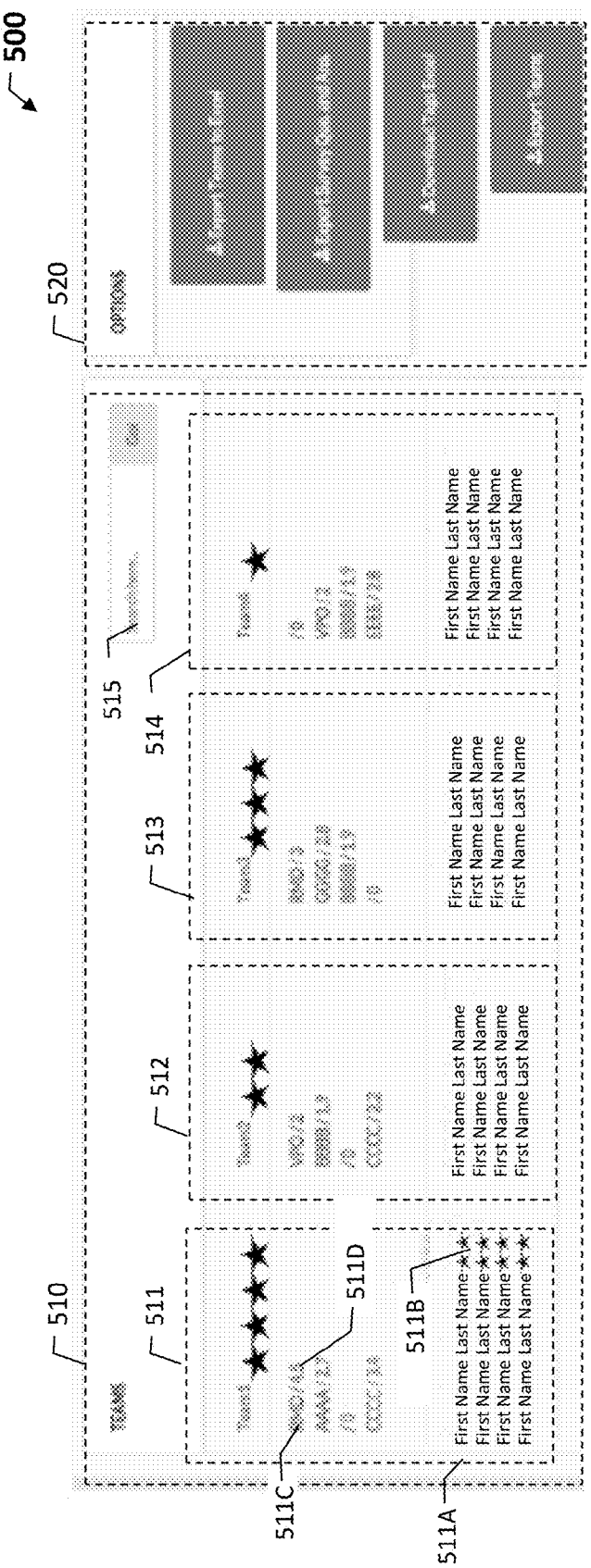

FIG. 5 shows a graphical user interface 500 for visualizing teams created by team creation module 127 in a tabular format. Interface 500 includes a team listing region 510 and an output options regions 520. Team listing region 510 includes a team roster regions 511, 512, 513, and 514, each of which presents list of members of its corresponding team in a similar way. Within each team roster region is a list of team members, of which list 511A is generally representative. In the exemplary embodiment, each listed team member is selectable to provide access to data and tags for the associated individual used in making the team assignment (more generally the corresponding user data structure 1231 in FIG. 1). Each listed team member is also associated with a numeric or symbolic rating 511B, for example a 1-to-3 star rating or a 1-100 point rating, indicative of the quality or importance each person on the team. (See appendix for how some embodiments determine this and one or ore other ratings described herein.) The team roster region also includes a summary tag portion 511C showing one or more summary tags which are descriptive of the entire team in some way. In some embodiments, the summary tags are the most frequent or least frequently occurring tags with the set of tags formed from aggregating the tags for all members of the team. Each summary tag portion 511C is also visually presented with a numeric or symbolic rating 511D, which indicates the prevalence or importance of the tag. Also included in some embodiments are centrality scores or measures for how similar or dissimilar members of a given team are too each other. In some embodiments, interface 600 enables authorized users drag and drop particular members of the population into other teams. (This is similar to functionality described below using FIG. 6.) Listing region 510 also includes a search function region 515, which enables searching of team rosters for particular individuals by name. Output options region 520 provides user selectable features, for example buttons, for invoking various outputs options, such as team roster export to spreadsheet; export of survey questions and answers, export or download of tags.

Figure 6:
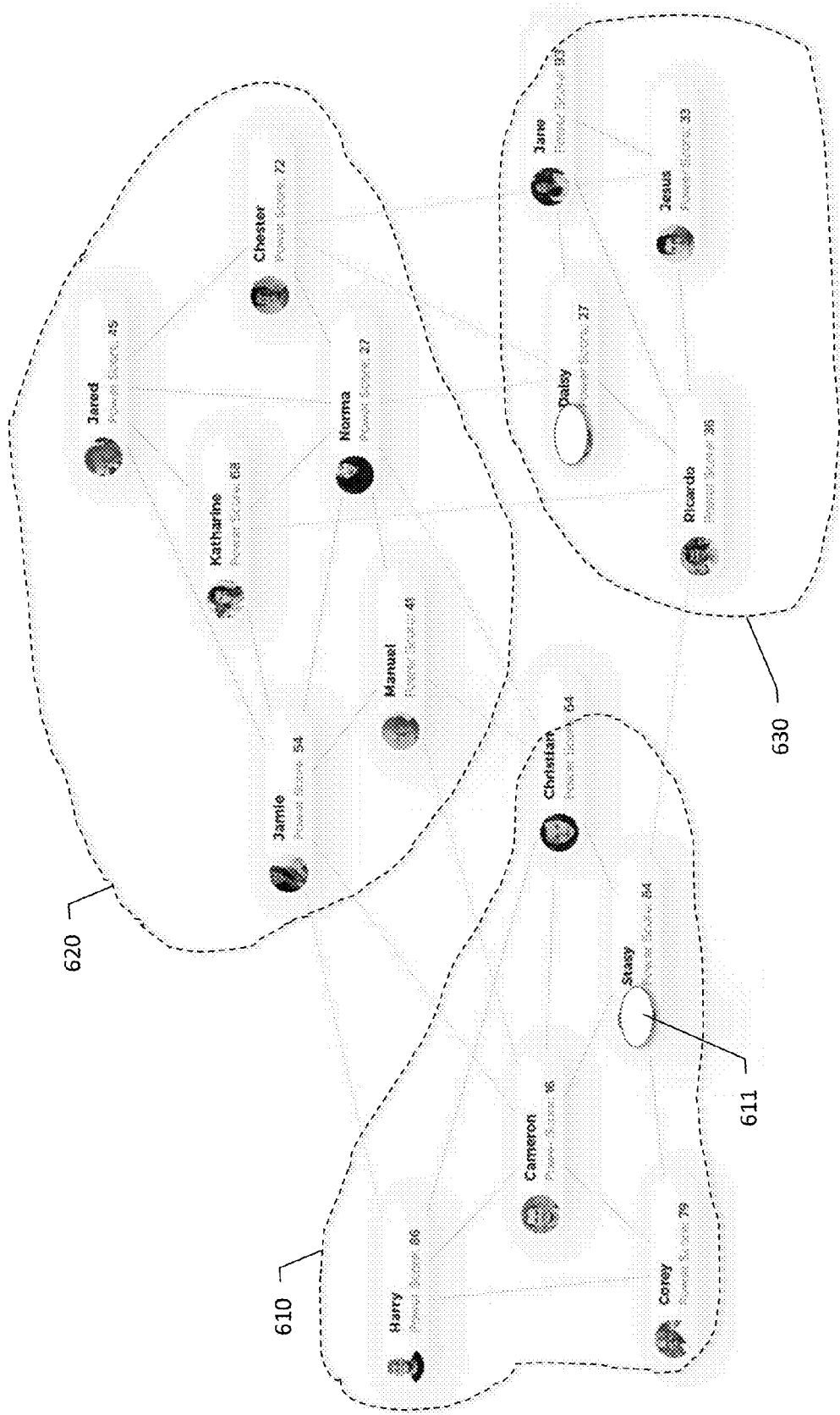

FIG. 6 shows an interactive network graph or mapping interface 600 for visualizing teams created by creation module 127. Interface 600 shows three teams 610, 620, and 630, with each team having lines of connection or relationship between its members, but also lines of connection to members of other teams. Also, interface shows that displays images representative of the members of those teams. In the exemplary embodiment, the presence of images provides views an indication of what types of data were used in assigning the given team members. For example, the lack of an image for team member 611 indicates that the given member was assigned without benefit of social media data or other types of data. In some embodiments, the lack of an image may indicate that the user did not complete a survey or that the associated team member lacked a prior work history. In some embodiments, the graph may be used to initiate message or other chat or other form of communication with a member. For example, in one embodiment, the graph may be used via authorized users to solicit team feedback or other information. In some embodiments, authorized users may select a user for reassignment on the graph, for example, via right-clicking over the user's name or associated icon on the graph to invoke display of a menu with one or more options, including reassignment. If the reassignment option is selected, the system will optimally replace the member with another from waiting list or with one member form an existing team. Additionally, some embodiments allow an authorized user to drag a member from one team to another team, with the authorized user being allowed to simply make the reassignment without adjusting the team assignments any further, or to optimally reassign one member from the team that the removed member was added to, to the team the moved member was dragged from. Relatedly some embodiments allow authorized users to select two members and swap their team assignments. In some embodiments, interface 600 enables authorized users to search for particular members of the population and to drag and drop them into other teams.

Figure 7:
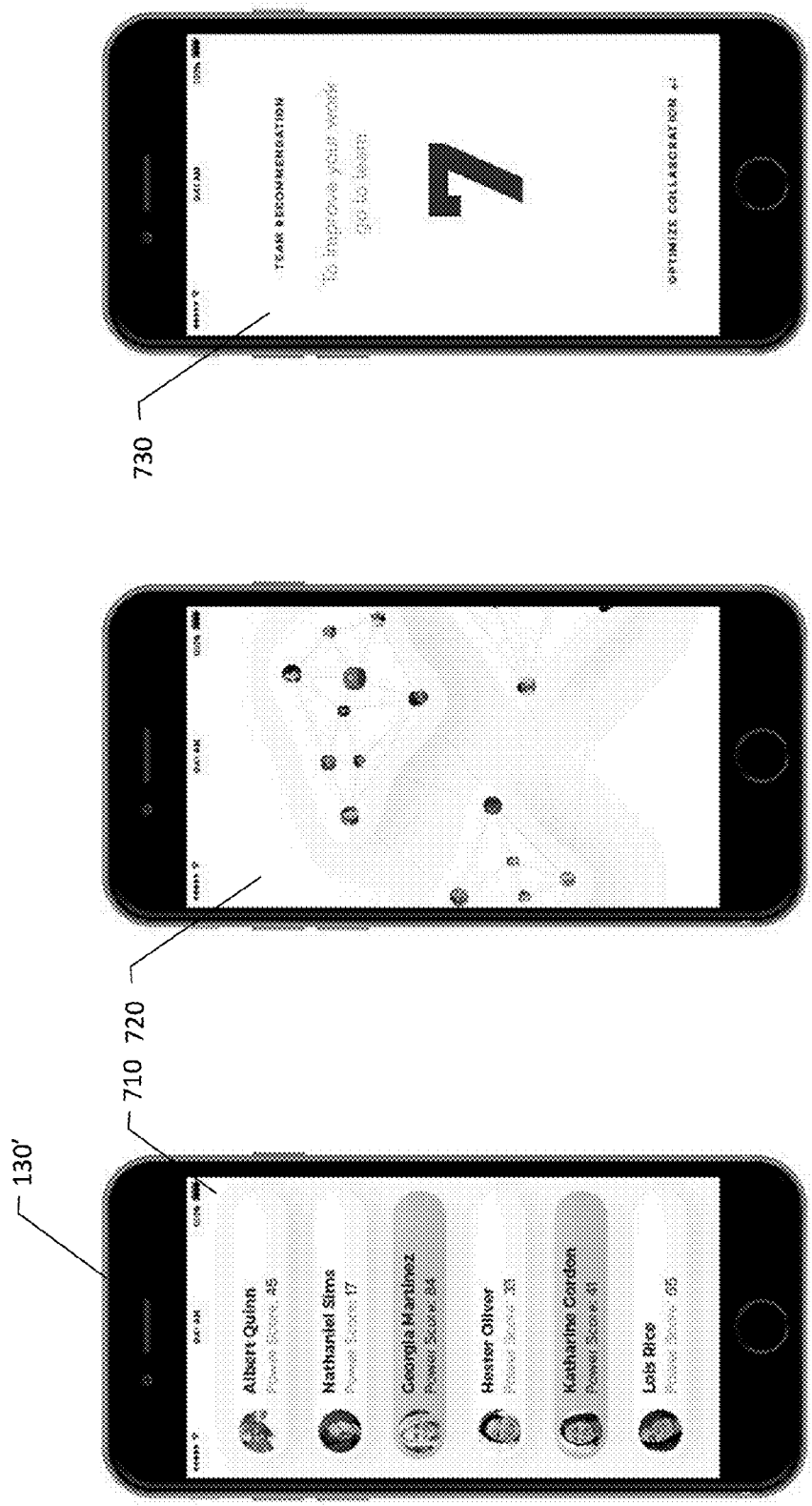
FIG. 7 is a series of facsimiles of a graphical user interface corresponding to one or more embodiments of the present invention.

FIG. 7 shows a series 700 of graphical user interfaces 710, 720, and 730 displayed on a smart phone version of access device 130, denoted 130'. Interface 710 shows a list of people and their corresponding Power Score™ rating computed based on quality of relationships and number of connections throughout the team formation population. For example, users with higher Power Score ratings have more connections between different communities of people that don't normally talk. Thus, a user having the most connections does not necessarily have the greatest Power Score rating. In this interface, each listed team member name is user selectable to invoke display of more information about each person.

Interface 720 shows a real-time network map or graph that is displayed as users information is collected during an event, for example during surveys or as they sign on and give access to their social media data. And interface 730 shows a real-time team assignment indicator for a particular individual, indicating which team a user has been assigned to. In some embodiments, this interface includes selection features enabling users to view a listing of their team mates and to access maps and other information about where and when to meet with their team mates.

Exemplary Use Cases

Various embodiments of the invention can be used in various ways to facilitate subgroupings of any larger group for any desired purpose. For example, in one real-time use case, a teacher, professor, or instructor can, through a smartphone app initiate transmission of electronic invitations to a group of students, via email or text message or other in-app communications, to their associated smartphones or tablets or laptops, with the invitation including one or more survey questions or links to a survey as well as prompts to provide access credentials or permissions for other databases, such as social media sites (Twitter, Facebook, Instagram, LinkedIn), email, etc. (Some embodiments may allow team organizers to simply present a written link to users to manual entry into their browsers). After sign up, which in some embodiments could entail download of an smartphone app or entry of an email address or providing an IP address or sign up via a third party application, the student users respond with provision of one or more aspects of the requested data, for example survey answers, enabling the system, for example the server, to create team assignments of desired size or sizes as previously described. In some embodiments, sign on via an email address or third party app allows access to one or more third party data stores and thus use of that data within the team formation process. The system can then notify each student of their team mates. In some embodiments, the students provide permissions and calendaring data, enabling the system to suggest in person or virtual meeting times. In some embodiments, the teacher inputs current grades or exam results into the system, the system may optimize formation of teams around high achieving students or other designated leaders or nodes, for example geographic nodes. Also, in some embodiments, student users as well as the organizing teacher or professor received real-time updates and access via their smartphone, tablet, or other access device regarding the names of persons that have signed into the team formation population.

In still other embodiments, as users complete surveys or provide other information (for example, Facebook or LinkedIn, Instagram, Pinterest, Meetup, EventBrite access or any other information from data sources 110), users are provided a dynamic network graph showing the creation process of their teams. In some embodiments, this dynamic display is provided only after a threshold number of users have submitted the requested data, for example 50, 60, 70, 80, 90, or 95%, with "stragglers" (late sign ons relative to the threshold number or relative to a sign on cut off time) being assigned to the best fitting undersized team based on the clustering algorithm. Some embodiments allow complete reformation of the teams to incorporate the stragglers, though this may not be desirable from the disruption of the other users.

In another use case, project managers within a consulting company has their entire staff of consultants entered into the system with past project assignment descriptions, consultants assigned to those projects, financial value, and time scope of the project, as well as performance reviews of the projects. New projects are entered into the system including topics and desired and essential expertise, temporal scopes, relational history of consultants to members of the client organization, etc. The project manager may also indicate desired team size and team assignment exclusions to avoid undesirable pairings of available consultants, enabling the exemplary system to determine an optimal team for handling the projects taking into account the available data. Additionally, if an ongoing team on an existing project loses a team member, the replacement team member may be determined in an optimal way leveraging all prior data within the system, advancing changes for a successful outcome.

In still another use case, the exemplary system can be used for any form of conference having four or more members to ensure optimal team formations. For example, in a global conference intended to promote information sharing or networking or problem solving, such as may occur at the United Nations, the system can be used to form new diverse teams around every meal time over the course of the conference, for example breakfast, topic groups, work streams, breakout groups, networking time. In some embodiments, members of a team formation population, for example conference attendees, may be outfitted with sociometric devices enabling the system to track the dynamic interactions between individual members in terms of level of engagement, for example by how long two or more members are engaged in a conversation, and then tag those members as having been on an adhoc team at a particular place and time, such as networking breakfast, and then feed this as separate type of data into the team formation process. The data can then be used to potentially recombine or separate these members in future team formations. Some variants of this embodiment explicitly allow members to electronically tag other members they meet throughout an event as members that they would or would not desire to be teamed with along with a strength rating of the desire, allowing users preferences to collected and taken into account for selected team formations.

Working groups around specific topics can also be performed. For instance, a set of 10 topics can entered into the system, with the system directed to ensure that each of the members is optimally assigned to one of the topics and that each team have certain number of participants. Also the same system can be operated in a reverse way to recommend an ordered list of topics associated with breakout sessions to conference attendees, helping them digest a large number of available options during breakout sections of the conference.

In another use case, event planners use various embodiments to form seating assignments based on table sizes and desired intermingling patterns between various groups. For example, for a family reunion, participants may be tagged for example as brothers, sisters, first, second cousins, etc or various lines of descent, and the system used to promote diverse sitting arrangements or teams for activities such as scavenger hunting teams, etc. Also wedding activities based on being a member of bride and groom side can be readily organized.

In another use case, an organizer can for example input or otherwise couple embodiments of the system to a database of amateur or professional athletes along with their historical statistics. This system enables team captains (organizing user) to select or otherwise define various attributes of a team or a subset of the team members and then request that the system suggest assignment or actually assign one or more other team members to each user's team based on the profile data for available (unassigned) team members.

In some embodiments, the system can operate in a "round robin" fashion with each organizing user having an opportunity to select one or more available players that have been determined be best available candidates for his or her team. In this use case, the system can function as draft or recruiting advisor for virtual (fantasy) or actual sports teams, such basketball, football, baseball. Similarly, another use case can be used to evaluate a pool of candidates (internal or external) for fit with an existing organization or with one or more teams within an organization, providing further insight to hiring and promotional decisions.

In yet another use case, the system can be coupled into an enterprise resources planning (ERP) platform of a business and used to form groups of people based on data from the ERP platform. For example a music concert could run its attendees through our software to assign a section of the concert venue without the administrator or user even knowing they have used the software to enhance user experience through facilitated arrangement of the crowd.

In still other use cases, the system can be used to group devices or objects into optimal groups based on attributes of the devices or objects. For example, a rental company may have a database of rental items to be distributed and warehoused in two or more rental centers throughout a geographic area, with each rental time have a projected and/or historical rental performance history, warehousing costs, expected life, shipping costs, etc. The user, for example an asset manager of the rental business, can enter rules or positive and negative constraints, the system operated to group the rental items for maximum profit for a given rental center or for all rental centers. Some embodiments provide a graphical user interface with optimized selections to help the asset manager make purchases decisions for new rental equipment for individual for one or more, including all, rental centers based on available capital budget and profile data, including pricing data, for new or used rental items.

In yet another use case, various embodiments can organize a larger group of people into subgroups or teams around a set of knowledge areas, ideas, topics, themes, or functional nodes. For example, an organization can use this approach to reorganize itself, more precisely all or some subsets of its members around current functions or roles or a set of equiweighted or prioritized problems, challenges, or initiatives. In particular, a team of engineers or creative of various expertise, skill and experience level may be organized into two or more teams competing to solve one problem or into teams optimized to solve several different problems, such as developing three new products.

APPENDIX

Some embodiments provide a rating system, for example, a 3-star rating system for the teams based on the survey responses and/or other data used in team formation process. For example, some embodiments rate each team based on the similarity of individual survey questions responses of its team member, with the underlying ratings computations contingent on the type of survey question. For a single-choice combination question (i.e., question that is used to promote assignments of users with similar responses to same team, for example users in the same corporate department), one embodiment determines the proportion of population having same value or response for the question. Thus, for example, if in a team 70% of them have identified the same department then score for this question for this team is 0.7

For a single choice separation question (i.e., question that is used to promote assignments of users with similar response to different teams), one embodiment, determines number of distinct answers for the given question on the team and divides this by the group (team) size. So if everyone has distinct values, then the number of distinct values equals the group size and the score will be 1. Generally, the lesser the number of distinct values, the greater is the overlap.

For multiple choice combination questions (questions that are used to promote assignment of users with similar responses to the same team), one embodiments determines the proportion for each tag present in the group (filtering out those tags which are not present at all). With a perfect match defined as 1, this embodiment, based on number and proportion of matches for tags, incrementally builds a total score as follows, stepping through the set of tags for a given team:

If there is a tag having proportion=1 than add 1*0.8 to score

If there is a tag having proportion>=0.8 than add proportion*0.7

If there is a tag having proportion>=0.6 than add proportion*0.3

If there is a tag having proportion>=0.4 than add proportion*0.2

If there is a tag having proportion>=0.4 than add proportion*0.2

Then, the adjusted tag proportions are summed to determine a true tag proportion. The gist of this approach is that the value add for increased proportion is not linear, but nonlinear, with every incremental proportion value indicative of a greater potential or power for team collaboration.

Some embodiments determine ratings at team level (using question level performance). For example, one embodiment determine group level performance (using question level performance). This entails excluding those questions which have −5 weighting (since −5 is intended to avoid performance drop rather than to improve performance). But, if there is a question with −5 weighting and proportion with score less than 1 then, this embodiment assigns a group score of 0 (no star) since the basic condition is not met. Next, this embodiment computes weighted average of individual question scores–weighted by question weight (not slider weight). Then it determines group level performance from cluster error (percentiles). This entails retrieving average distance between a pair (in the cluster) for each cluster and assigning star values or ratings based on defined thresholds for each rating. For example:

if team error is <=0.25 quantile (of team error), a 3 star rating is assigned;

if 0.25<Team error<=0.5, a 2 star rating is assigned;

if 0.5<Team error<=0.75, a 1 star rating is assigned; and if Team error>0.75, zero stars are defined.

In order to address situations where there is a significant overlap between these buckets, for example $25^{th}$ percentile is approximately same as 50 percentile, one embodiment assigns the same star rating for the 25 and 50 percentiles. To facilitate this, a 2% cushioning concept is used, meaning that the thresholds are cushioned or increased by 2% to allow for higher star rating to be applied if a team error is within 2% of a threshold.

CONCLUSION

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms, such as second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments, for example those involving smartphones, tablets, computers, smart watches, may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, some embodiments can be implemented as a computer-readable storage medium having computer readable code stored thereon for programming a computer (e.g., including a processor) to perform a method as described and claimed herein. Likewise, computer-readable storage medium can include a non-transitory machine readable storage device, having stored thereon a computer program (machine executable instructions) that include a plurality of code sections for performing operations, steps or actions as described herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Smartphone, smart watches, and other devices referred to herein my include one or more processing circuits and associated or operatively coupled non-transient memory for storing machine-readable and executable instructions as well as associated data for carrying out, supporting, or otherwise facilitating one or more of the functions or aspects of the functionality described herein.

The invention claimed is:

1. A method of processing electronic data in a computer system, comprising:
    collecting electronic data about a set of four or more users into a memory, with the data logically organized into four or more respective user data structures, wherein the collected electronic data about the four or more users includes a first question identifier logically associated with respective first and second user survey question responses for first and second users and a second question identifier logically associated with first and second user survey question responses for the first and second users;
    providing a graphical user interface on a display device, the graphical user interface having one or more interactive regions configured to accept user input at least partially defining a magnitude and polarity of at least one weight to be applied to corresponding portions of the collected electronic data for each of the set of for or more users;
    optimally determining two or more non-overlapping subgroupings of the set of four or more user data structures without requiring that one or more of the subgroupings meet a subgrouping size constraint, wherein optimally determining the subgroupings includes computing similarity metrics between pairs of users based on the collected electronic data and iteratively redefining the subgroupings to satisfy an optimal similarity metric for all the non-overlapping subgroupings, wherein computing similarity metrics between pairs of users based on the collected electronic data, includes:
        computing a first distance quantity based on the first user survey question responses for the first and second users;
        computing a second distance quantity based on the second user survey question responses; and
        computing a weighted sum of at least the first and second distance quantities, with the weighted sum based on the magnitude and polarity of the at least one weight;
    resizing one or more of the optimally determined subgroupings to define a set of resized subgroupings that satisfy a predetermined user-specified numerical subgroup size constraint; and
    generating a graphical user interface presentation of the resized subgroupings.

2. The method of claim 1, wherein each of the users has an associated user identifier, and wherein collecting electronic data about the four or more users, includes logically associating each user identifier with one or more survey question identifiers and with one or more corresponding user survey question responses.

3. The method of claim 2:
    wherein the collected electronic data about the four or more users includes first and second sets of network analysis data logically associated with respective first and second user identifiers; and
    wherein computing similarity metrics between the respective user data structures based on the collected electronic data, includes:
        computing a similarity based on the first and second sets of network analysis data.

4. The method of claim 3, wherein the first set of network analysis data includes data regarding names or identity or contact data of one or more persons that have had communications with the user associated with the first user identifier, and the second set of network analysis data includes data regarding names or identity or contact data of one or more persons that have had communications with the user associated with the second user identifier.

5. The method of claim 2:
    wherein the collected electronic data about the four or more users includes first and second sets of network analysis data logically associated with respective first and second user identifiers; and
    wherein computing similarity metrics between the respective user data structures based on the collected electronic data, includes:
        computing a similarity based on the first and second sets of network analysis data.

6. The method of claim 5:
    wherein the collected electronic data about the four or more users includes first and second sets of demographic profile data logically associated with respective first and second user identifiers; and
    wherein computing similarity metrics between users based on the collected electronic data, includes:
        computing a similarity based on the first and second sets of demographic profile data.

7. The method of claim 1, further comprising determining first and second sets of tags from the first and second user survey question responses for the first and second users; and wherein the first distance quantity is based on the first and second sets of tags.

8. The method of claim 7, wherein the first distance quantity is based on Jaccard similarity of the first and second sets of tags.

9. The method of claim 1, wherein resizing one or more of the optimally determined subgroupings to define the set of resized subgroupings that satisfy the user-specified group size constraint, includes referencing a stored set of user preferences and in response to at least one of the stored preferences excluding at least two of the respective user data structures from being grouped in the same subgrouping regardless of their similarity metrics or including at least two respective user data structures within the same one of the resized subgroupings regardless of their similarity metrics.

10. The method of claim 1, wherein the graphical user interface presentation includes a network graph including a set to four or more selectable icons representative of the respective four or more users, with each icon selectable to cause display of one or portions of the corresponding user data structure.

11. The method of claim 1, wherein one or more of the interactive regions configured to accept user input at least partially defining a magnitude and polarity of at least one weight includes a slider having positive and negative regions.

12. The method of claim 11, wherein the polarity of the weight determines which one of a set of at least two possible values for similarity metrics are used.

13. The method of claim 1, further comprising:
    updating the four or more user data structures to include information regarding the resized subgroupings; and
    optimally determining two or more second subgroupings of the set of four or more user data structures based at least on the electronically collected data and the information regarding the resized subgroupings.

14. The method of claim 13, further comprising receiving a first user input indicative of whether the second subgroupings are to allow regrouping of data structures that were grouped in the same subgrouping in the resized groupings; wherein the second subgroupings are determined based on at least on the electronically collected data, the resized subgroupings, and the first user input.

15. The method of claim 14, wherein the optimal similarity metric is the average pairwise distance between the user data structures, with the pairwise distances between user data structures based on a weighted sum of two or more distance values, with one of the distance values based on a first type of data within each user data structure and another of the distance values based on a second type of data with each user data structure, and with the first distance value weighted by a first weight and the second distance value weighted by a second weight.

16. The method of claim 15, further comprising providing a graphical user interface having at least one interactive feature configured to enable a user to at least partially determine a value of the first weight.

17. The method of claim 1, further comprising:
providing a graphical user interface having at least one interactive feature configured to at least allow a user to define a constraint that the user data structures for at least two of the four or more users are to be included in the same subgrouping or to be excluded from being in the same subgrouping;
wherein resizing one or more of the optimally determined subgroupings to satisfy a user-specified subgroup size constraint includes also satisfying the constraint.

18. The method of claim 1, wherein collecting electronic data about the set of four or more users, with the data logically organized into four or more respective user data structures, includes:
providing a set of one or more users access to an electronic survey;
detecting real-time access to the electronic survey by one or more of the users;
providing a real-time display indicating the name or identity of each of the users as they access the electronic survey on one or more access devices;
creating in real-time a network graph structure in memory based on responses to one or more questions in the electronic survey; and
providing a real-time display of the network graph structure to one or more of the users in response to completion of one or more portions of the electronic survey.

19. The method of claim 18, wherein collecting electronic data about the set of four or more users includes retrieving social media data for one or more of the users; and wherein the network graph structure is based on the electronic survey and the retrieved social media data.

20. The method of claim 18, wherein the electronic survey includes at least one question regarding an area of professional expertise for the user; at least one question regarding a personal passion or interest; or at least one question regarding a potential or desired legacy of the user.

21. The method of claim 1, wherein collecting the electronic data includes collecting electronic data from in real-time from a set of 100 or more users.

* * * * *